United States Patent [19]
Tonosaki et al.

[11] Patent Number: 5,581,395
[45] Date of Patent: Dec. 3, 1996

[54] NON-LINEAR OPTICAL CRYSTAL ELEMENT

[75] Inventors: Minehiro Tonosaki; Hiroyuki Wada, both of Kanagawa, Japan

[73] Assignee: Sony Corporation, Tokyo, Japan

[21] Appl. No.: 369,767

[22] Filed: Jan. 6, 1995

[30] Foreign Application Priority Data

Jan. 12, 1994 [JP] Japan .................... 6-001467

[51] Int. Cl.⁶ .......................................... G02F 1/35
[52] U.S. Cl. .......................................... 359/326; 359/328
[58] Field of Search ....................... 359/326–332; 385/122; 372/21, 22

[56] References Cited

U.S. PATENT DOCUMENTS

| | | | |
|---|---|---|---|
| 4,955,977 | 9/1990 | Dao et al. ..................... | 359/332 X |
| 5,129,029 | 7/1992 | Uemiya et al. ................. | 385/122 |
| 5,175,784 | 12/1992 | Enomoto et al. ............... | 385/122 |
| 5,343,327 | 8/1994 | Chai et al. .................... | 359/330 |

*Primary Examiner*—John D. Lee
*Attorney, Agent, or Firm*—Lise A. Rode, Esq.; Pasquale Musacchio, Esq.; Jerry A. Miller

[57] ABSTRACT

A non-linear optical crystal element preferably of BBO or KDP arranged within a resonator for generating a light beam in the wavelength range of UV rays based on a radiated light beam of a basic wave. The non-linear optical crystal element is preferably hexahedral-shaped and has a protective film on its surface. The protective film is made up of at least two layers arranged on an incident surface and an outgoing surface of the non-linear optical crystal element. The layer of the protective film directly contacted with the incident surface or the outgoing surface is formed by ion plating.

19 Claims, 8 Drawing Sheets

NON-LINEAR OPTICAL CRYSTAL ELEMENT

BACKGROUND

1. Field of the Invention

This invention relates to a non-linear optical crystal element. More particularly, it relates to a non-linear optical crystal element having an optical thin film exhibiting low reflectance with respect to ultraviolet light.

2. Background of the Invention

In the field of optoelectronics performing information processing or measurement control using laser light, a demand is raised for a shorter wavelength and a higher output of the laser light radiated from a laser light source.

In an ultraviolet wavelength range of 400 nm or less, a semiconductor laser cannot be excited into oscillations without difficulties. Thus a laser light source has been conceived which exploits the phenomenon of second harmonic generation (SHG) of the non-linear optical crystal element. This laser light source converts the wavelength of the incident light by a wavelength converter employing a non-linear optical crystal element and radiates an ultraviolet (UV) laser light a beam, that is a laser light beam in the wavelength range of ultraviolet rays. The laser light source has a non-linear optical crystal element in a ring-shaped resonator and generates the UV laser light on radiating a laser light beam as a basic wave to the non-linear optical crystal element.

On the surface of the non-linear optical crystal element is formed an optical film for reflecting the UV rays comprising a non-reflective coating film preferably formed by vacuum deposition.

For the non-linear optical crystal element, a single crystal of potassium dihydrogenphosphate (KDP) or barium borate (BBO) or the like is employed. Since the non-linear optical crystal element, such as KDP or BBO, is a deliquescent single crystal, it needs to be protected against crystal destruction otherwise caused by deliquescence. However, the thin film formed by heating of a single crystal substrate of BBO or KDP followed by vacuum deposition is generally of a cylindrical structure and water-permeable and hence cannot play the role of a protective film. That is, the optical thin film formed on the single crystal by vacuum deposition is low in atomic or molecular density and hence permits the moisture in air to be intruded into interstices between atoms deposited by vacuum deposition. The UV laser light radiated from the non-linear optical crystal element is then subjected to wavelength shift because of the difference in the refractive index between the moisture and the single crystal of KDP or BBO.

SUMMARY OF THE INVENTION

It is therefore an object of the present invention to provide a non-linear optical crystal element which resolves the above-mentioned problems.

In one aspect, the present invention provides a non-linear optical crystal element for generating a light beam in a wavelength range for UV rays based upon a light wave of a basic wave radiated thereto. The non-linear crystal element comprises an incident surface irradiated with the light beam of the basic wave, an outgoing surface from which the light beam of the wavelength range of the UV rays is radiated, and a protective film formed on the incident surface and on the outgoing surface. The protective film has at least two layers, of which the layer directly contacted with the incident surface or the outgoing surface is formed by ion plating.

In another aspect, the present invention provides a non-linear optical crystal element for generating a light beam in a wavelength range for UV rays based upon a light wave of a basic wave radiated thereto. The non-linear optical crystal element is hexahedral-shaped and formed of a deliquescent material. The non-linear optical element comprises an incident surface irradiated with the light beam of the basic wave, an outgoing surface facing the incident surface and from which the light beam of the wavelength range of the UV rays is radiated, and a multilayer protective film formed on at least the incident surface and the outgoing surface. One of the layers of the protective film directly contacted with the incident surface or the outgoing surface is formed by ion plating and the other layer of the protective film formed on the layer directly contacted with the incident surface or the outgoing surface is formed by a thin film forming method.

According to the present invention, since the layer of the protective film formed on at least the incident surface and the outgoing surface of the non-linear optical crystal element is formed by ion plating so that the layer directly formed on the surface of the non-linear optical crystal element is dense, there is no risk that the moisture in air may be intruded into the layer directly formed on the surface of the non-linear optical crystal element to alter the refractive index of the layer directly formed on the surface of the non-linear optical crystal element even though the non-linear optical crystal element is used in air or in atmosphere. Consequently, stable wavelength conversion may be realized with the use of the non-linear optical crystal element of the present invention.

BRIEF DESCRIPTION OF THE DRAWINGS

FIG. 8 is a graph showing the results of spectrophotometric analyses of an optical thin film exhibiting a low reflectance against UV rays according to a seventh embodiment of the present invention.

DESCRIPTION OF THE INVENTION

Preferred embodiments of the non-linear optical crystal element according to the present invention will be explained in detail.

The optical thin film exhibiting low reflectance to UV rays according to the preferred embodiments is formed on the surface of a non-linear crystal element constituting a light wavelength converter employed in a laser light source to generate laser light. Specifically, the optical thin film comprises a multi-layer non-reflective coating film formed on the surface of the non-linear optical crystal element, which has the function of SHG of converting the wavelength of incident light (preferably 532 nm) to a wavelength of preferably 266 nm for the output UV rays radiated from the surface of the crystal element. (The optical thin film having low reflectance with respect to the UV rays herein means that the film has low reflectance with respect to the laser light of the wavelength of 532 nm as the basic wave, as described above).

For the non-linear optical crystal element, a single crystal of potassium dihydrogenphosphate (KDP) or barium borate (BBO) is employed. In the present embodiment, a BBO single crystal 1 is used as the non-linear optical crystal element).

Figure 1:
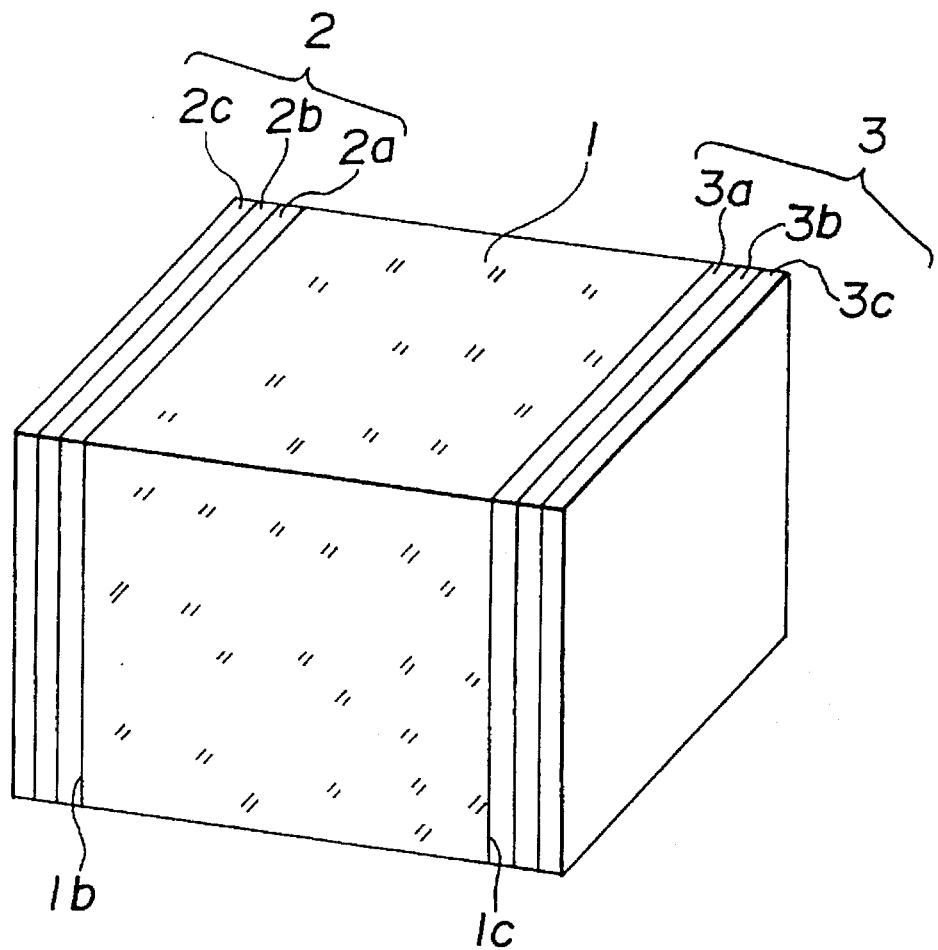
FIG. 1 is a perspective view of a non-linear optical crystal element according to the present invention.

The BBO single crystal 1 is hexahedral-shaped, as shown in FIG. 1. On at least a pair of two planar surfaces 1b, 1c of the hexahedral-shaped BBO single crystal 1 respectively are formed optical thin films 2, 3. One of these two facing surfaces 1b facing each other is an incident surface on which falls the above-mentioned laser light having the wavelength of 532 nm, while the other surface 1c is a radiating surface via which the laser light having the wavelength of 266 nm is radiated. Each of the optical thin films 2, 3, formed on these surfaces 1b, 1c, is a multi-layer film comprising at least two layers. Of these, the first layers 2a, 3a in contact with the surfaces of the BBO single crystal are deposited by ion plating. The second and third layers 2b, 2c, 3b and 3c, deposited on the first layers 2a, 3a, may be deposited by ion plating, sputtering or vacuum deposition. Since the first layers 2a, 3a in contact with the surfaces 1b and 1c of the BBO single crystal 1, among the optical thin films and 3, are formed by ion plating, it becomes possible to improve the packing density of atoms deposited on the surfaces 1b and 1c of the BBO single crystal 1. In other words, since it becomes possible to raise the density of ion-plated atoms on the surfaces 1b and 1c of the BBO single crystal 1, it becomes possible to form a dense film, such that the moisture in air cannot be intruded into the first films 2a, 3a. The result is that the first films 1a and 2a are not subjected to changes in reflectance for protecting the incident and outgoing surfaces of the BBO single crystal 1. Even if the moisture in air is intruded via the second or third films 2b, 2c, intrusion into the BBO single crystal 1 is inhibited by the first films 2a.

In each of the following embodiments, at least the first layers 2a, 3a of the optical thin films 2, 3 are formed on the surfaces 1b, 1c of the BBO single crystal 1. Although the optical thin films are formed only on the surfaces 1b and 1c of the BBO single crystal because BBO is less susceptible to deterioration due to deliquescence than KDP, it is possible to form the optical thin films on all of the six surfaces of the BBO single crystal 1. If the optical thin films are formed on the hexahedral-shaped KDP single crystal, it is desirable to form the optical thin films on all of the six surfaces thereof in order to prevent deterioration due to deliquescence.

The second layer and other layers (of any), as well as the first layer, play the part not only of a protective film for the BBO single crystal 1, but also of a non-reflective optical thin film with respect to the basic wave having the wavelength of 532 nm. The second film and other layers, are formed by thin film forming techniques, such as by vacuum deposition or sputtering, so that the optical absorption coefficient (K) is equal to zero, and the layers become non-reflective against the basic wave having the wavelength of 532 nm.

The optical thin films formed on the BBO single crystal are so designed as to be non-reflective with respect to the basic wave mainly of 532 nm and reflective by tenths of a of percent with respect to the high harmonics having the wavelength of 266 nm. It is however desirable for the optical thin films to be as low as possible in reflectance with respect to the second harmonics having the wavelength of 266 nm in view of the wavelength conversion efficiency.

The material of which the optical thin films 2 and 3 are formed is of such properties as to convert the basic wave having the wavelength of 532 nm into second harmonics having the wavelength of 266 nm. Thus the material is selected from among materials having high transmittance with respect to the light of the wavelength of UV rays, such as oxides, e.g. $Al_2O_3$, $HfO_2$ or $SiO_2$.

Although the linear thermal coefficient of the BBO single crystal differs by one digit of magnitude depending on the crystal axis, the first film formed by ion plating exhibits high bonding properties with respect to the BBO single crystal, such that none of the optical thin films of the respective embodiments whose first layers towards the BBO single crystal were produced by ion plating was destroyed by anisotropic thermal expansion of the BBO single crystal. On the other hand, the surface of the BBO single crystal on which the optical thin films have been formed was not subjected to deliquescence, and no crystal destruction was observed.

The equations for wavelength dispersion are:

$$n_o^2 = 1.9595 + 0.7892 \cdot \lambda^2/(\lambda^2 - 0.021613)$$

$$n_e^2 = 1.6932 + 0.6782 \cdot \lambda^2/(\lambda^2 - 0.01816)$$

where $\lambda$ is the wavelength, $n_O$ is the refractive index for the normal light and $n^e$ is the refractive index for the abnormal light. From the above equations for the wavelength dispersion, the BBO single crystal has the refractive index values of 1.67 and 1.76 for the basic wave having the wavelength of 532 nm and for the second harmonics having the wavelength of 266 nm, respectively.

In the following embodiments, the refractive index conditions include refractive indices of respective layers of the optical thin films. The phase condition is given by (phase condition) = $n \cdot d/\lambda_s$ where n is the refractive index of each layer, d is the physical thickness or actual thickness of each layer and $\lambda_s$ is the design center wavelength. "-IP" denotes that the film has been formed by ion plating. In the following embodiments, optical thin films were formed on the BBO single crystal by the ion plating method employing a unit "BAP-1000" manufactured by BLAZERS INC.

EXAMPLE 1

| Structure | Substrate | First Layer | Second Layer | Third Layer |
|---|---|---|---|---|
| Material | BBO | $Al_2O_3$ - IP | $HfO_2$ | $MgF_2$ |
| Refractive Index Condition | 1.67 | 1.67 | 2.00 | 1.38 |
| Phase Condition | — | Film Thickness Arbitrary | 0.5 | 0.25 |

In the present Example, the phase condition was set for $\lambda_s$=600 nm.

In the present Example 1, the thin films were formed so as to satisfy an equation $$n_3/n_1 = \sqrt{n_s}$$

where $n_s$ is the refractive index of BBO substrate and $n_1$, $n_3$ are refractive index values of the first and third films, respectively.

In the present Example 1, a thin optical film having low reflectance with respect to UV rays and having a three-layer structure is formed. With the three-layer structure, a first layer of an $Al_2O_3$ film was formed by ion plating as a first layer directed to the BBO single crystal, while the second film of $HfO_2$ and the third film of $MgF_2$ were formed by usual vacuum deposition.

The refractive index of the $Al_2O_3$ film, formed by ion plating, is of the same value as that of the BBO single crystal, while the dispersion is also the same as the BBO single crystal over two wavelengths. Thus the optical film thickness of the first film may be set arbitrarily without affecting the design of the second and following films. The first $Al_2O_3$ film formed by ion plating plays the role of a protective film, while the second $HfO_2$ film and third $MgF_2$ film play the part of non-reflective coating films.

For the second and following films of Example 1, the second $HfO_2$ film and the third $MgF_2$ film were used as being of UV transmitting materials satisfying the refractive index condition and capable of being formed into a thin film by usual vacuum deposition.

Figure 2:
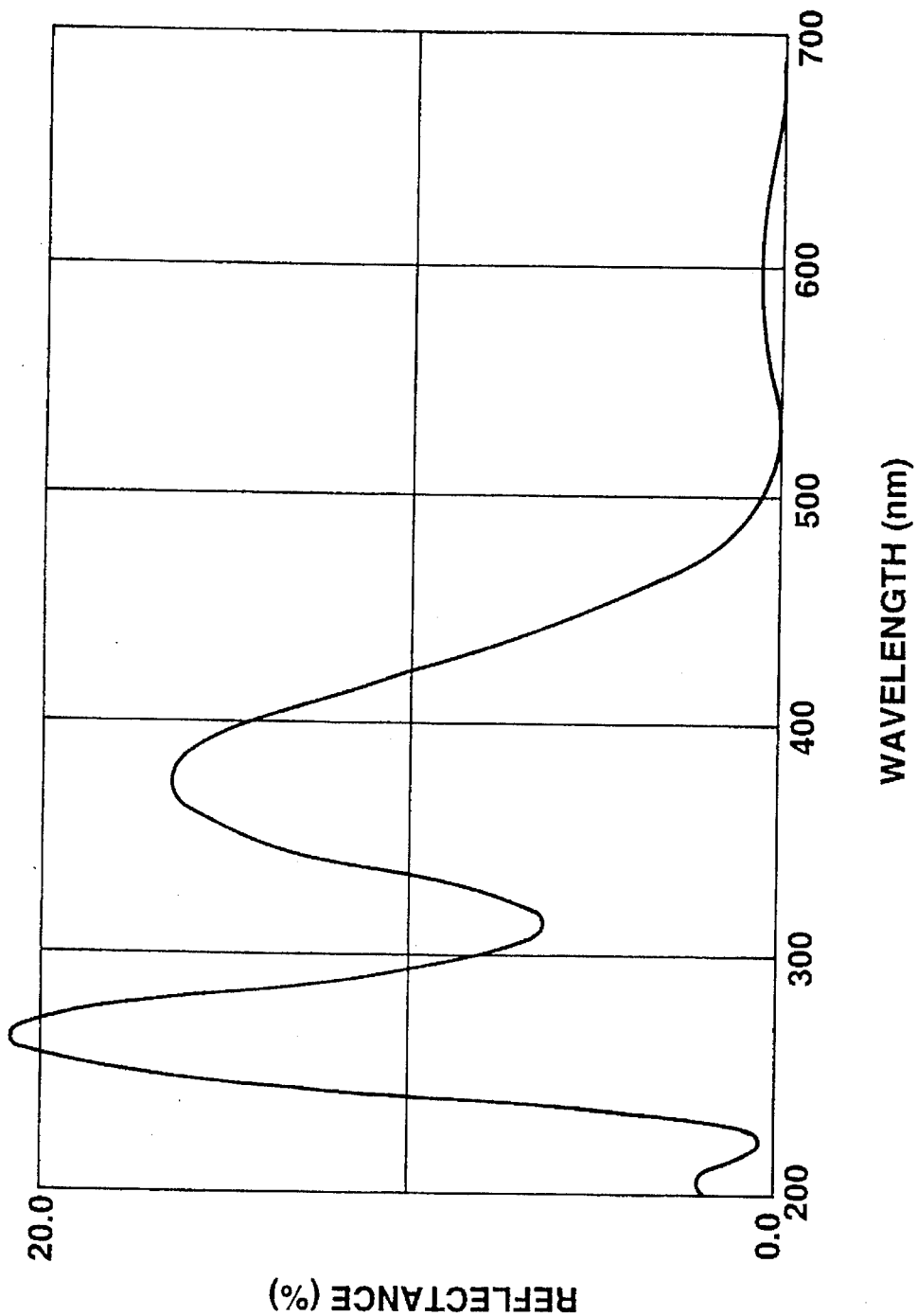
FIG. 2 is a graph showing the results of spectrophotometric analyses of an optical thin film exhibiting a low reflectance against UV rays according to a first embodiment of the present invention.

Spectrometric analyses were conducted on the optical thin films of Example 1. The results of the analyses are shown in FIG. 2, from which it is seen that, with the optical thin films of the present Example 1, the desired non-reflective characteristics can be obtained for the basic wave having the wavelength of 532 nm and the second harmonics having the wavelength of 266 nm.

EXAMPLE 2

| Structure | Substrate | First Layer | Second Layer |
|---|---|---|---|
| Material | BBO | $HfO_2$ - IP | $Al_2O_3$ - IP |
| Refractive Index Condition | 1.67 | 2.11 | 1.66 |
| Phase Condition | — | 0.25 | 0.25 |

In the present Example 2, the phase condition was found for $\lambda_s = 532$ nm. In the present Example 2, film formation was so made that the relation $$n_2/n_1 = \sqrt{n_s}$$

is met, where $n_s$ is the refractive index of the substrate and $n_1$, $n_2$ are refractive index values of the first and second layers, respectively.

The present Example 2 is directed to optical thin films having a low reflectance with respect to UV rays of a dual-layer structure comprising a first ion-plated $HfO_2$ layer adjacent to the BBO single crystal and a second ion-plated $Al_2O_3$ layer.

In the optical thin films of the dual-layer structure of the present Example 2, the first $HfO_2$ film and the second $Al_2O_3$ film, formed by ion plating, play the part not only of the protective film but also of the non-reflective coating film.

Figure 3:
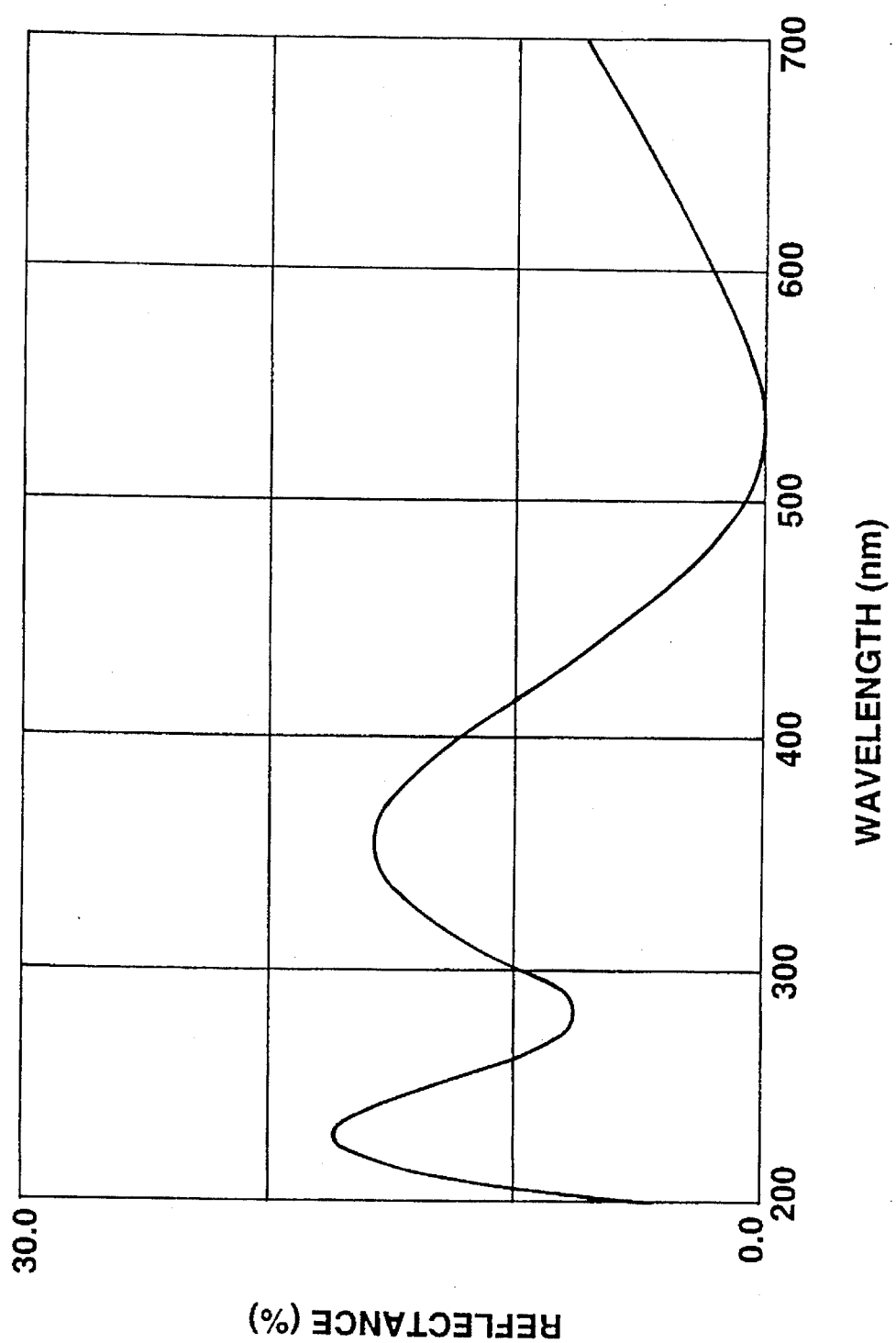
FIG. 3 is a graph showing the results of spectrophotometric analyses of an optical thin film exhibiting a low reflectance against UV rays according to a second embodiment of the present invention.

Spectrometric analyses were conducted on the optical thin films of Example 2. The results of the analyses are shown in FIG. 3, from which it is seen that, with the optical thin films of the present Example 2, the desired non-reflective characteristics can be obtained for the basic wave having the wavelength of 532 nm and the second harmonics having the wavelength of 266 nm.

EXAMPLE 3

| Structure | Substrate | First Layer | Second Layer | Third Layer |
|---|---|---|---|---|
| Material | BBO | $SiO_2$ - IP | $Al_2O_3$ - IP | $SiO_2$ - IP |
| Refractive Index Condition | 1.67 | 1.47 | 1.67 | 1.47 |
| Phase Condition | — | 0.25 | 0.25 | 0.25 |

In the present Example 3, the phase condition was set for $\lambda_s = 532$ nm. In the present Example 3, film formation was made so that the equation $$n_1 \cdot n_3 = n_2 \sqrt{n_s}$$

was met, where $n_1$, $n_2$ and $n_3$ are the refractive index values of the first, second and the third films, respectively.

In the present Example 3, thin optical films having low reflectance against UV rays having a three-layer structure are formed. Within the three-layer structure, a first layer of a $SiO_2$ film was formed by ion plating as a first layer adjacent to the BBO single crystal, while the second film of $Al_2O_3$ and the third film of $SiO_2$ were formed by usual vacuum deposition.

With the optical thin films of the present Example 3 having the three-layer structure, the first layer of a $SiO_2$, the second layer of $Al_2O_3$ and the third layer of $SiO_2$ play the part of the protective films and the non-reflective coating films.

Figure 4:
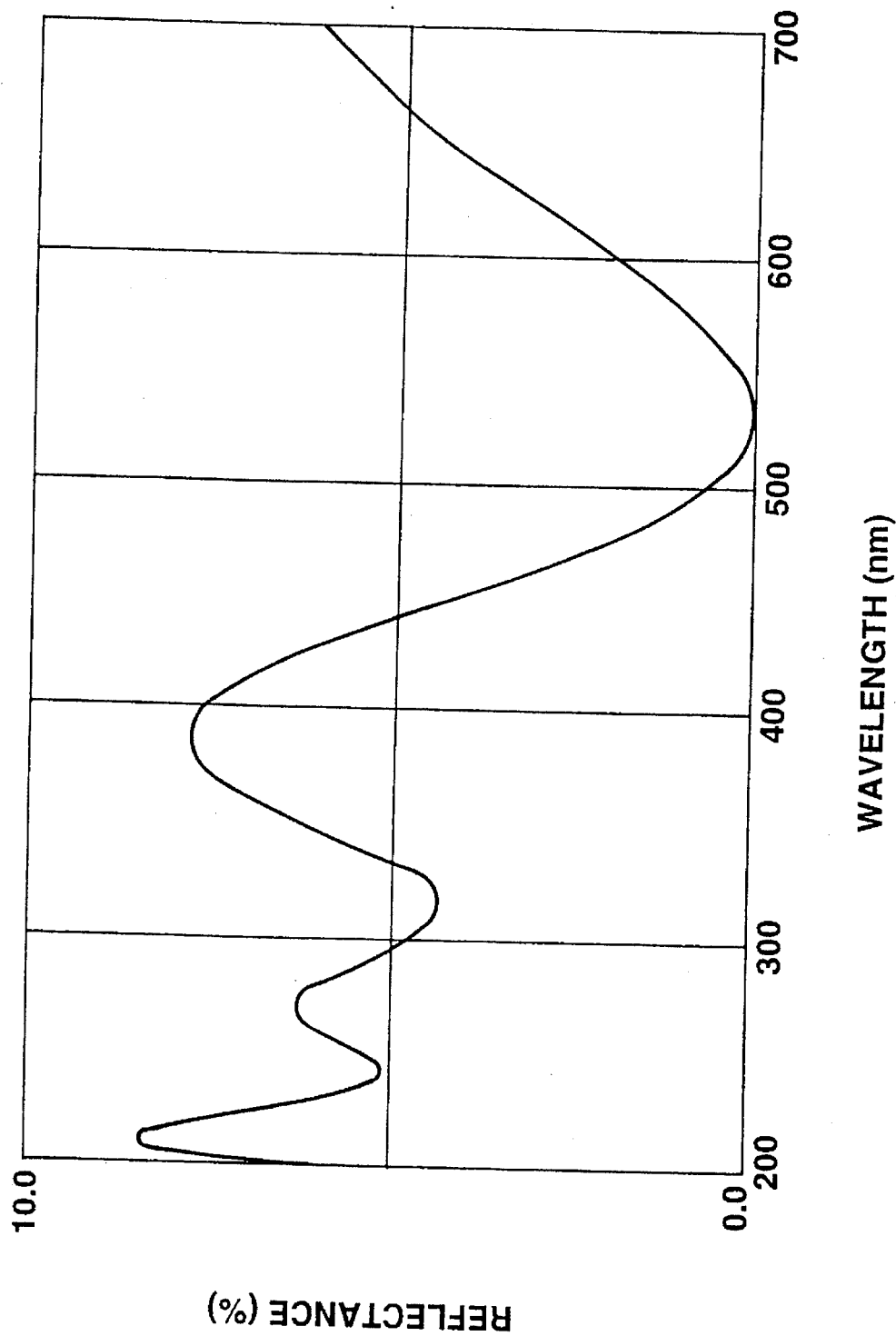
FIG. 4 is a graph showing the results of spectrophotometric analyses of an optical thin film exhibiting a low reflectance against UV rays according to a third embodiment of the present invention.
Figure 5:
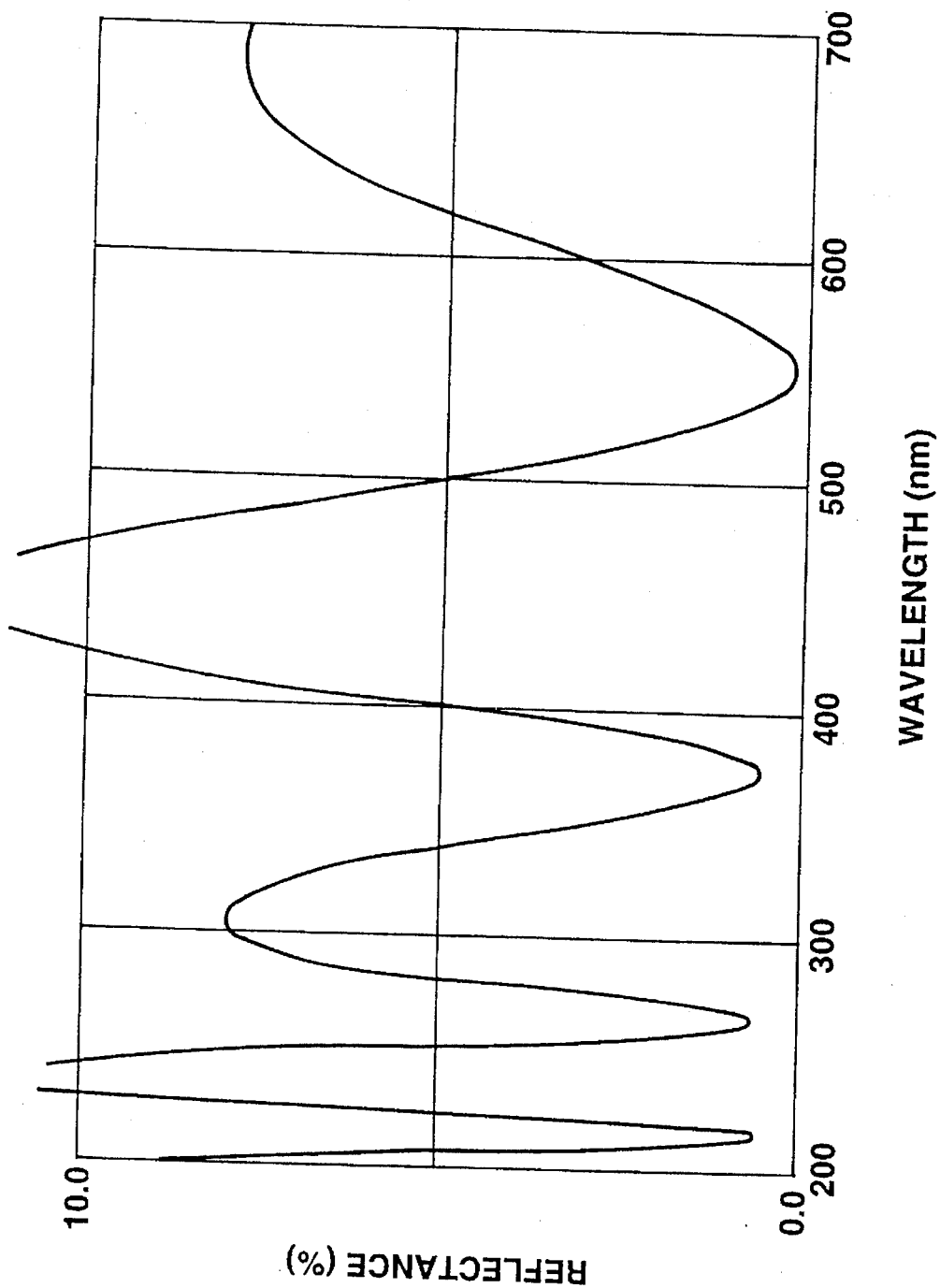
FIG. 5 is a graph showing the results of spectrophotometric analyses of an optical thin film exhibiting a low reflectance against UV rays according to a fourth embodiment of the present invention.

Spectrometric analyses were conducted on the optical thin films of Example 3. The results of the analyses are shown in FIG. 4, from which it is seen that, with the optical thin films of the present Example 3, the desired non-reflective characteristics can be obtained for the basic wave having the wavelength of 532 nm and the second harmonics having the wavelength of 266 nm.

EXAMPLE 4

| Structure | Substrate | First Layer | Second Layer | Third Layer |
|---|---|---|---|---|
| Material | BBO | $SiO_2$ - IP | $Al_2O_3$ - IP | $SiO_2$ - IP |
| Refractive Index Condition | 1.67 | 1.47 | 1.67 | 1.47 |
| Phase Condition | — | 0.25 | 0.125 | 0.75 |

With the optical thin films of the present Example 4, the phase condition was set with the design center wavelength in Example 3 being changed to 600 nm from 532 nm.

Spectrometric analyses were conducted on the optical thin film of Example 4. The results of the analyses are shown in FIG. B, from which it is seen that, with the optical thin film of the present Example 4, the desired non-reflective characteristics can be obtained for the basic wave having the wavelength of 532 nm and the second harmonics having the wavelength of 266 nm.

EXAMPLE 5

| Structure | Substrate | First Layer | Second Layer | Third Layer |
| --- | --- | --- | --- | --- |
| Material | BBO | SiO$_2$ - IP | NdF$_3$ | MgF$_2$ |
| Refractive Index Condition | 1.67 | 1.47 | 1.60 | 1.38 |
| Phase Condition | — | 0.25 | 0.25 | 0.25 |

In the present Example 5, the phase condition was set for $\lambda_s=532$ nm. In the present Example 5, film formation was made so that the equation $$n_1 \cdot n_3 = n_2 \sqrt{n_s}$$

was met, where $n_1$, $n_2$ and $n_3$ are the refractive index values of the first, second and the third films, respectively.

In the present Example 5, a thin optical film exhibiting low reflectance with respect to UV rays and having a three-layer structure was formed. As the three-layer structure, a first layer of a SiO$_2$ film was formed by ion plating as a first layer adjacent to the BBO single crystal, while the second film of NdF$_3$ and the third film of MgF$_2$ were formed by usual vacuum deposition.

In the optical thin films of the three-layer structure according to the present Example 5, the first layer formed by ion plating played the part of the protective film and the non-reflective coating, while the second film of NdF$_3$ and the third film of MgF$_2$ played the part of the non-reflective coating.

Figure 6:
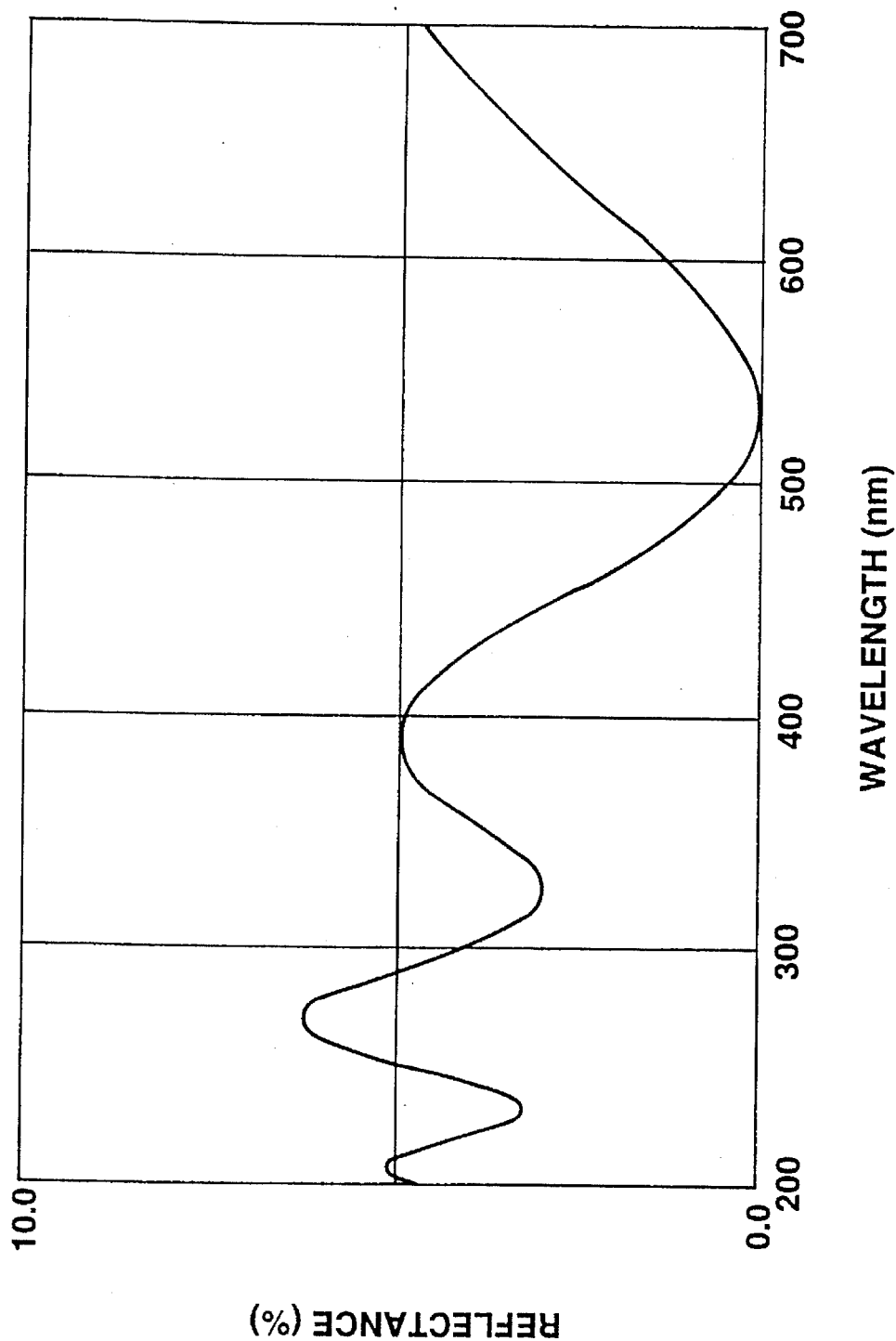

Spectrometric analyses were conducted on the optical thin film of Example 5. The results of the analyses are shown in FIG. 6, from which it is seen that, with the optical thin film of the present Example 5, the desired non-reflective characteristics can be obtained for the basic wave having the wavelength of 532 nm and the second harmonics having the wavelength of 266 nm.

EXAMPLE 6

| Structure | Substrate | First Layer | Second Layer | Third Layer |
| --- | --- | --- | --- | --- |
| Material | BBO | SiO$_2$ - IP | NdF$_3$ | MgF$_2$ |
| Refractive Index Condition | 1.67 | 1.47 | 1.60 | 1.38 |
| Phase Condition | — | 0.25 | 0.125 | 0.75 |

With the optical thin films of the present Example 6, the phase condition was set with the design center wavelength Example 6 being changed to 580 nm from 532 nm.

Figure 7:
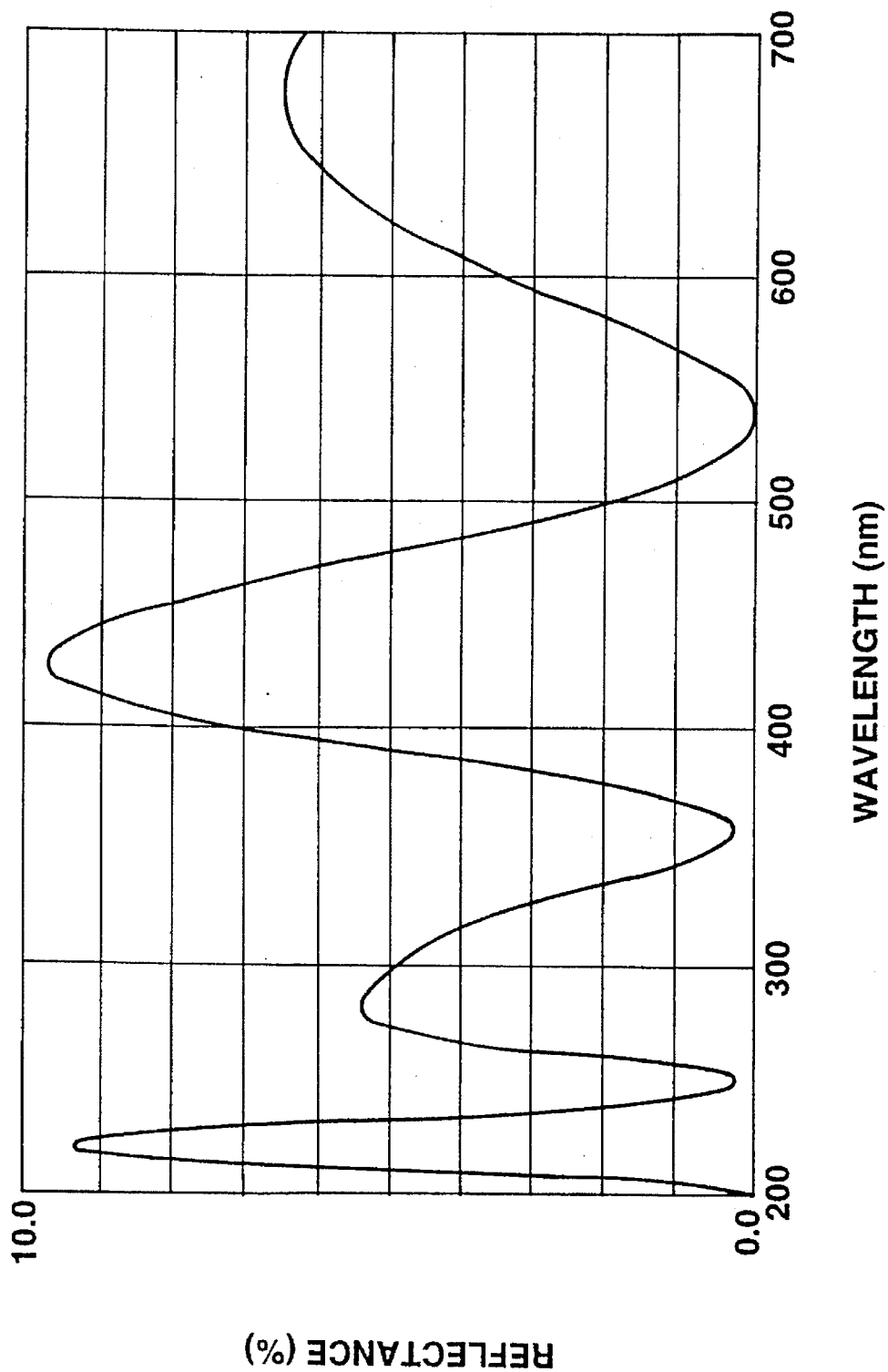
FIG. 7 is a graph showing the results of spectrophotometric analyses of an optical thin film exhibiting a low reflectance against UV rays according to a sixth embodiment of the present invention.

Spectrometric analyses were conducted on the optical thin film of Example 6. The results of the analyses are shown in FIG. 7, from which it is seen that, with the optical thin film of the present Example 6, the desired non-reflective characteristics can be obtained for the basic wave having the wavelength of 532 nm and the second harmonics having the wavelength of 266 nm.

EXAMPLE 7

| Structure | Substrate | First Layer | Second Layer | Third Layer | Fourth Layer |
| --- | --- | --- | --- | --- | --- |
| Material | BBO | SiO$_2$ - IP | NdF$_3$ | HfO$_2$ | MgF$_2$ |
| Refractive Index Condition | 1.67 | 1.47 | 1.60 | 2.00 | 1.38 |
| Phase Condition | — | 0.25 | 0.25 | 0.50 | 0.25 |

In the present Example 7, the phase condition was set for $\lambda_s=532$ nm. In the present Example 7, film formation was made so that the equation $$n_1 \cdot n_4 = n_3 \sqrt{n_s}$$

was met, where $n_s$ is the refractive index of the substrate and $n_1$, $n_3$ and $n_4$ are the refractive index values of the first, third and the fourth layers, respectively.

With the Example 7, an HfO$_2$ film was provided as a buffer layer between the second NdF$_3$ layer and the third MgF$_2$ layer of the Example 5 to provide an optical thin films having the four-layer structure and exhibiting low reflectance with respect to UV rays.

Figure 8:
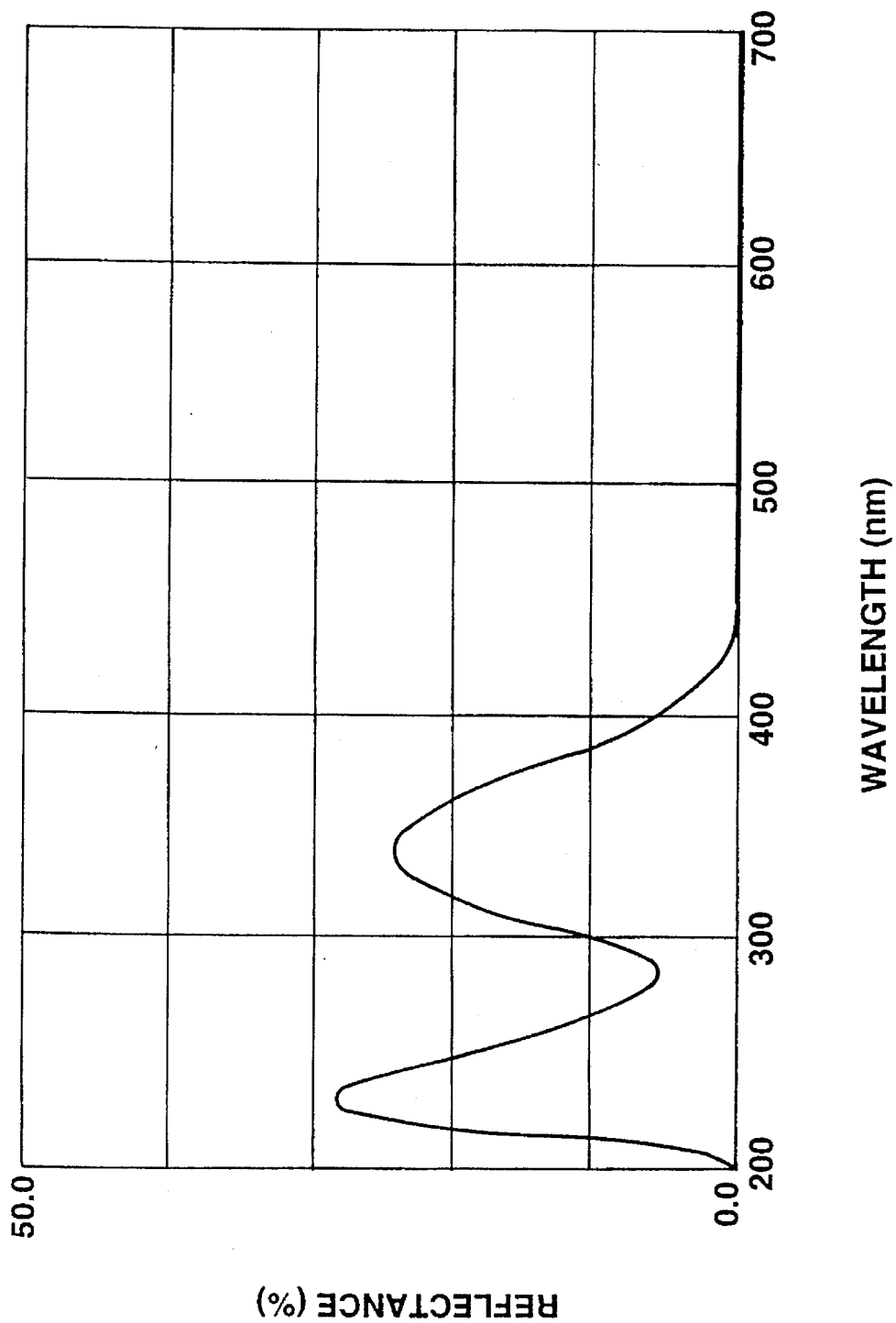
FIG. 8 is a graph showing the results of spectrophotometric analyses of an optical thin film exhibiting a low reflectance against UV rays according to a fifth embodiment of the present invention.

Spectrometric analyses were conducted on the optical thin film of Example 7. The results of the analyses are shown in FIG. 8, from which it is seen that the non-reflective area for the basic wave having the wavelength of 532 nm could be enlarged as compared to that of the optical thin films of Example 5.

In FIGS. 2 to 8, the wavelength used for measurement and the reflectance are plotted on the abscissa and on the ordinate, respectively.

With the above-described embodiments, the first layer formed of oxides, e.g. oxides, such as Al$_2$O$_3$, HfO$_2$ or SiO$_2$, are formed by ion plating on at least a pair of mutually opposite surfaces of the BBO single crystal as the non-linear optical crystal element. However, the material of the first layers deposited on BBO as the non-linear optical crystal element may also be fluorides, such as MgF$_2$ or LiF, in place of the above-mentioned oxides. Similarly to Al$_2$O$_3$, HfO$_2$ or SiO$_2$, the fluorides, such as MgF$_2$ or LiF, have the absorption coefficient k equal to zero and exhibit light transmittance up to the wavelength range of UV rays, such that the range of transmittance of the fluorides is broader than that of the oxides.

The oxides may also be MgO, ScO$_3$ or Y$_2$O$_3$, in addition to the above-cited oxides.

According to the present invention, the first layers having excellent bonding properties with respect to the surface of the non-linear optical crystal element may be formed by in plating on the surface of the non-linear optical crystal element, such as BBO or KDP. These first layers are dense and play the part of protective layers. The result is that the non-linear optical crystal element, such as BBO or KDP, may be employed in air or atmosphere.

While the present invention has been explained with respect to several preferred Examples, it is not limited to these Examples and is intended to cover any modifications as may come within the scope of the following claims.

What is claimed is:

1. A non-linear optical crystal element for generating a light beam in a wavelength range for UV rays based upon a light wave of a basic wave radiated thereto, said non-linear optical crystal element being formed of a deliquescent material, comprising:

an incident surface of said element irradiated with the light beam of the basic wave;

an outgoing surface of said element from which the light beam of the wavelength range of the UV rays is radiated; and, a protective film formed on said incident surface and on said outgoing surface, said protective film having at least first and second layers, and said first layer being formed directly on said incident surface or said outgoing surface by ion plating, whereby said first layer forms a moisture protection layer for protecting said non-linear optical crystal element against crystal destruction caused by deliquescence due to moisture.

2. The non-linear optical crystal element of claim 1, wherein said protective film is formed so as to be non-reflective with respect to the light beam incident on said incident surface.

3. The non-linear optical crystal element of claim 1, wherein the first layer is formed of an oxide capable of transmitting the light beam in the wavelength range of the UV rays.

4. The non-linear optical crystal element of claim 3, wherein the first layer is formed of aluminum oxide.

5. The non-linear optical crystal element of claim 3, wherein the first layer is formed of hafnium oxide.

6. The non-linear optical crystal element of claim 3, wherein the first layer is formed of silicon dioxide.

7. The non-linear optical crystal element of claim 3, wherein said oxide is selected from the group consisting of magnesium oxide, scandium oxide, and yttrium oxide.

8. A non-linear optical crystal element for generating a light beam in a wavelength range for UV rays based upon a light wave of a basic wave radiated thereto, said non-linear optical crystal element being hexahedral-shaped and being formed of a deliquescent material, comprising:

an incident surface of said element irradiated with the light beam of the basic wave;

an outgoing surface of said element from which the light beam of the wavelength range of the UV rays is radiated, said outgoing surface facing said incident surface; and, a multi-layer protective film formed on at least said incident surface and said outgoing surface, a first layer of said multi-layer protective film being formed directly on said incident surface or said outgoing surface by ion plating so that said first layer forms a moisture protection layer for protecting said non-linear optical crystal element against crystal destruction caused by deliquescence due to moisture, and a second layer of said multi-layer protective film being formed on said first layer by a thin film forming method.

9. The non-linear optical crystal element of claim 8, wherein said protective film is formed so as to be non-reflective with respect to the light beam incident on said incident surface.

10. The non-linear optical crystal element of claim 8, wherein the first layer is formed of an oxide capable of transmitting the light beam in the wavelength range of the UV rays.

11. The non-linear optical crystal element of claim 10, wherein the first layer is formed of aluminum oxide.

12. The non-linear optical crystal element of claim 10, wherein the first layer is formed of hafnium oxide.

13. The non-linear optical crystal element of claim 10, wherein the first layer is formed of silicon dioxide.

14. The non-linear optical crystal element of claim 8, wherein said element is formed of barium borate.

15. The non-linear optical crystal element of claim 14, wherein said first layer is formed on two sides of said hexahedral-shaped element.

16. The non-linear optical crystal element of claim 8, wherein said element is formed of potassium dihydrogenphosphate.

17. The non-linear optical crystal element of claim 16, wherein said first layer is formed on six sides of said hexahedral-shaped element.

18. A non-linear optical crystal element for generating a light beam in a wavelength range for UV rays based upon a light wave of a basic wave radiated thereto, comprising:

an incident surface of said element irradiated with the light beam of the basic wave;

an outgoing surface of said element from which the light beam of the wavelength range of the UV rays is radiated; and, a protective film formed on said incident surface and on said outgoing surface, said protective film having at least two layers, a first of said layers directly contacted with said incident surface or said outgoing surface and being formed by ion plating, wherein the first layer is formed of a fluoride capable of transmitting the light beam in the wavelength range of the UV rays.

19. The non-linear optical crystal element of claim 18, wherein said first layer is selected from the group consisting of magnesium fluoride and lithium fluoride.

* * * * *